June 7, 1960      D. W. CARLSON      2,939,195
FILM FASTENER
Filed March 11, 1957
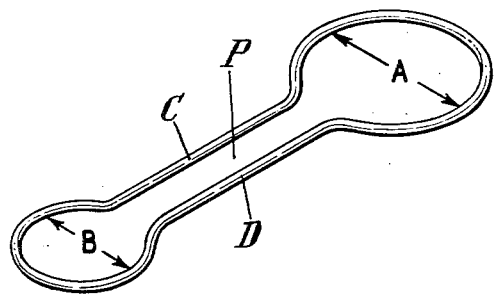
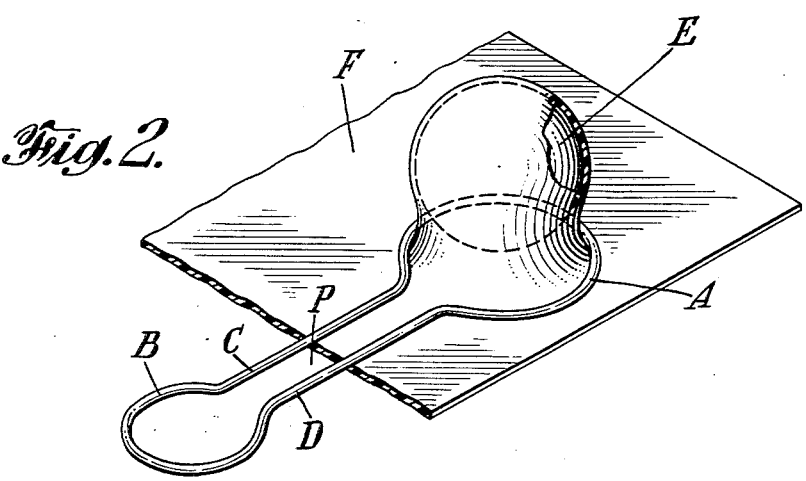
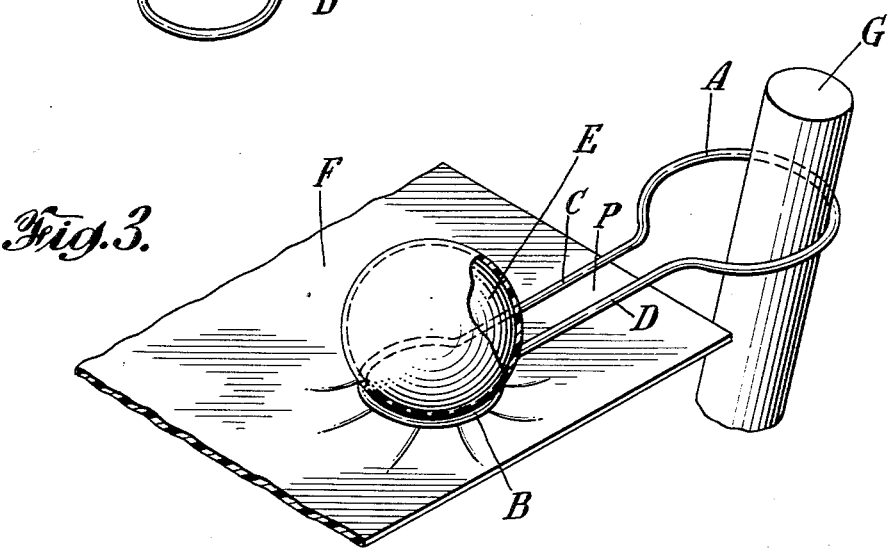
INVENTOR
DONALD W. CARLSON

United States Patent Office 2,939,195
Patented June 7, 1960

2,939,195

FILM FASTENER

Donald W. Carlson, Terre Haute, Ind., assignor to Union Carbide Corporation, a corporation of New York Filed Mar. 11, 1957, Ser. No. 645,257

4 Claims. (Cl. 24—245)

This invention relates to film fasteners, and more particularly to devices which can be applied to a flexible film, serving as a tie-down for covers and tarpaulins formed of plastic sheeting, particularly polyethylene film.

The desirability of plastic sheeting for covers, tarpaulins, and the like is accompanied by the difficulty of holding it in position. Penetrating fasteners such as pins, tacks, and nails, and also metal eyelets, tend to tear through the film, and gripping devices are subject to the same difficulty, particularly when provided with serrated jaws.

The main object of the present invention is to avoid these difficulties and to provide a film fastener less prone to tear the film.

According to the present invention, the film fastener comprises an endless wire having a larger circular loop at one end and a smaller circular loop at the other end, and an elastic ball of slightly smaller diameter than the inside of said larger circular loop, but of larger diameter than the inside of said smaller circular loop. The endless wire has a constriction between the loops having a width less than the diameter of said smaller loop. Preferably the endless wire forms a metal clip, the side portions of which between the loops are brought toward each other to form the constricted passage. The elastic ball, preferably of sponge rubber, is placed on one side of a sheet of plastic film, and pushed with the plastic sheet through the larger loop, then along the constricted passage into the smaller loop. Here the plastic sheet expands into contact with the loop and serves as a grommet to reinforce the film against tearing. Thereafter the larger loop is appropriately secured to a fixed support.

In the drawings:

Fig. 1 is a perspective view of the clip part of the fastener according to the preferred embodiment of the present invention;

Fig. 2 is a perspective view of the elastic ball and plastic sheeting pushed through the larger loop; and Fig. 3 is a perspective view of the elastic ball and plastic sheeting in position in the smaller loop.

The film fastener shown in the drawing comprises an endless wire having a larger diameter loop A at one end, and a smaller diameter loop B at the other end. The side portions C and D between the loops are brought toward each other to form a constricted passage P of a width less than the diameter of the smaller loop B. The wire is preferably of uniform circular cross section to form a smooth surfaced clip.

In addition to the clip, the fastener comprises an elastic ball E of slightly smaller diameter than the inside of the larger loop A, but of larger diameter than the inside of loop B. This ball E is preferably constructed of sponge rubber.

In operation, the sponge rubber ball E is placed on the underside of the film F and forced with the film through the large loop end A. The film conforms to the spherical surface of the ball with which it is in contact, forms a pocket for the ball, and necks down therebelow, evenly distributed around the loop A.

In this condition the endless wire is pushed toward the film-covered ball E in its pocket, so that the neck of the film slides along the central slot or passage P of the endless wire into the smaller loop end B where it expands into evenly distributed contact with the loop B, which serves as a grommet to reinforce the film against tearing. The film-covered ball is larger than the smaller loop, making it impossible to pull the ball with the film through the smaller loop. Also, the sponge rubber tends to give or equalize the stress placed on the film in reference to the surfaces of the smaller end, thus making a secure fastener. When the invention is used to tie down a tarpaulin, the larger loop A is secured by a peg G in the ground.

This procedure can be reversed, allowing the ball with the film to be released through the larger loop end, and a detachment is made without injury to the film. Thus this fastener can be placed at any location, giving the desired tie-down characteristics to a cover or tarpaulin made of flexible films.

In the use of this tarpaulin or cover, a plurality of these fasteners are applied at spaced positions along the marginal edges which are to be tied down, and the larger loop of each fastener is secured to a fixed element.

Although the invention is particularly suitable for tying down tarpaulins and covers of polyethylene, the principle of the invention is also applicable to other flexible films and fabrics.

What is claimed is:

1. Film fastener for tying down flexible film as a cover or tarpaulin, comprising a completely unattached freely movable endless metal wire of smooth circular cross section having a larger circular loop at one end, a smaller circular loop at the other end, and a construction between said loops having a width less than the diameter of said smaller circular loop; in combination with a completely unattached, freely movable sponge rubber ball freely movable relative to said wire and having an uninterrupted outer surface of slightly smaller diameter than the inside of said larger loop, but of larger diameter than the inside of said smaller loop whereby said sponge rubber ball may be passed under said film and pushed therewith up through said larger circular loop to form a pocket with said ball therein and a neck therebelow, and said neck may be contracted to slide through said constriction into said smaller circular ring and there expand to relieve the contraction in said neck and spread into evenly distributed contact with said smaller loop.

2. Film fastener for tying down flexible film as a cover or tarpaulin, comprising an endless wire having a larger circular loop at one end and a smaller circular loop at the other end, and a freely movable elastic spherical ball devoid of protuberance and of slightly smaller diameter than the inside of said larger circular loop but of larger diameter than the inside of said smaller circular loop, said fastener being placed on one side of the film and the elastic ball being free of attachment to said wire so as to be placed in any position on the other side of said film in register with the larger loop and pushed with the film through said larger loop with the film necked therein, and the fastener being pushed longitudinally to bring the necked portion of the film into the smaller loop and there expand into evenly distributed contact therewith to serve as a grommet.

3. In combination with a film of plastic, preferably polyethylene, a fastener for tying down said film as a cover or tarpaulin comprising, a clip having a loop at one end thereof adapted to be attached to a fixed element and a smaller loop at the opposite end, said loops being connected by constriction of a width less than the diameter of said smaller loop, a freely movable elastic spherical ball devoid of protuberance of a diameter less than that of the first named loop but greater than that of said smaller loop, said ball being disposed in a pocket of said plastic film formed by forcing the film with said ball at the underside of said film through said larger loop and then sliding the neck of the film adjacent said ball through said constriction which contracts the neck, and into said smaller loop, whereby the pocketed ball is disposed in position on the smaller loop, and said constricted neck spreads into evenly distributed contact with said smaller loop.

4. A method of tying down flexible film as a cover or tarpaulin, which comprises forcing the film together with an elastic spherical ball devoid of protuberance on the underside of said film at any distance from the edge thereof through a loop of a diameter greater than that of said ball to simultaneously form a pocket in said film and dispose said ball therein, sliding the neck of the film extending from the pocket through a constricted opening which contracts said neck, sliding said contracted neck into and disposing said film pocketed ball on a loop having a diameter less than that of said ball, expanding said contracted neck into evenly distributed contact with said smaller loop, and thereafter attaching the first named loop to a securing element.

References Cited in the file of this patent

UNITED STATES PATENTS

| | | |
|---|---|---|
| 605,480 | Harrison | June 14, 1898 |
| 619,948 | Fitzsimons | Feb. 21, 1899 |
| 1,264,515 | Heckenkamp | Apr. 30, 1918 |
| 1,401,340 | Lindsay | Dec. 27, 1921 |
| 1,563,195 | Jimenez | Nov. 24, 1925 |
| 1,909,561 | Abraham | May 16, 1933 |
| 2,089,221 | Patur et al. | Aug. 10, 1937 |
| 2,246,359 | Jelinek et al. | June 17, 1941 |
| 2,745,163 | Van Buren | May 15, 1956 |

UNITED STATES PATENT OFFICE
CERTIFICATE OF CORRECTION

Patent No. 2,939,195                         June 7, 1960

Donald W. Carlson

It is hereby certified that error appears in the printed specification of the above numbered patent requiring correction and that the said Letters Patent should read as corrected below.

Column 2, line 34, for "construction" read -- constriction --.

Signed and sealed this 8th day of November 1960.

(SEAL)
Attest:

KARL H. AXLINE                            ROBERT C. WATSON
Attesting Officer                            Commissioner of Patents